United States Patent
Wang et al.

(10) Patent No.: US 12,396,019 B2
(45) Date of Patent: Aug. 19, 2025

(54) RADIO FREQUENCY EMISSION REDUCTION WITH INTERFERENCE CANCELLATION

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 17/648,909

(22) Filed: Jan. 25, 2022

(65) Prior Publication Data

US 2023/0300867 A1    Sep. 21, 2023

(51) Int. Cl.
*H04W 72/541*    (2023.01)
*H04J 1/00*    (2006.01)
*H04W 72/044*    (2023.01)
*H04W 72/21*    (2023.01)
*H04W 72/23*    (2023.01)

(52) U.S. Cl.
CPC ....... *H04W 72/541* (2023.01); *H04W 72/044* (2013.01); *H04W 72/21* (2023.01); *H04W 72/23* (2023.01)

(58) Field of Classification Search
CPC ... H04W 72/541; H04W 72/21; H04W 72/23; H04W 72/044
See application file for complete search history.

(56) References Cited

U.S. PATENT DOCUMENTS

| | | | | |
|---|---|---|---|---|
| 7,864,873 | B2* | 1/2011 | Schnell | H04L 25/03159 375/260 |
| 8,054,742 | B2* | 11/2011 | Roh | H04L 27/26265 370/208 |
| 10,390,254 | B2* | 8/2019 | Kim | H04B 17/345 |
| 2012/0213312 | A1* | 8/2012 | Futatsugi | H04L 25/03828 375/296 |
| 2013/0005282 | A1* | 1/2013 | Zhang | H04L 25/03012 455/114.2 |

OTHER PUBLICATIONS

Brandes S., et al., "Sidelobe Suppression in OFDM Systems by Insertion of Cancellation Carriers," IEEE 62nd Vehicular Technology Conference, VTC-2005-Fall, Sep. 2005, pp. 152-156.

* cited by examiner

*Primary Examiner* — Intekhaab A Siddiquee
(74) *Attorney, Agent, or Firm* — Arun Swain

(57) ABSTRACT

Wireless communications systems and methods related to communicating information are provided. A method of wireless communication performed by a user equipment (UE). The method of wireless communication also includes receiving a configuration from a network for uplink transmission using a first plurality of subcarriers; receiving an instruction from the network for interference cancellation with respect to the first plurality of subcarriers; calculating a plurality of symbols and modulating the plurality of symbols on a second plurality of subcarriers in accordance with the instruction from the network for interference cancellation; and transmitting a waveform to the network, the waveform including the first plurality of subcarriers and the second plurality of subcarriers.

29 Claims, 10 Drawing Sheets

RADIO FREQUENCY EMISSION REDUCTION WITH INTERFERENCE CANCELLATION

TECHNICAL FIELD

This application relates to wireless communication systems, and more particularly, to reducing interfering emissions from an uplink signal.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE). The method of wireless communication also includes receiving a configuration from a network for uplink transmission using a first plurality of subcarriers; receiving an instruction from the network for interference cancellation with respect to the first plurality of subcarriers; calculating a plurality of symbols and modulating the plurality of symbols on a second plurality of subcarriers in accordance with the instruction from the network for interference cancellation; and transmitting a waveform to the network, the waveform including the first plurality of subcarriers and the second plurality of subcarriers.

In an additional aspect of the disclosure, a non-transitory computer-readable medium having program code recorded thereon. The non-transitory computer-readable medium also includes code for configuring a user equipment (UE) for uplink transmission on a first plurality of subcarriers; code for instructing the UE to perform interference cancellation with respect to the first plurality of subcarriers and a first frequency domain area associated with a sidelink transmission; code for receiving a waveform from the UE, the waveform including the first plurality of subcarriers and a plurality of interference cancellation subcarriers; and code for decoding information in the waveform, including discarding portions of the waveform associated with the interference cancellation subcarriers.

In an additional aspect of the disclosure, an apparatus includes a transceiver; and a processor coupled to the transceiver and configured to: receive a configuration from a network for uplink transmission according to an uplink frequency allocation; receive an instruction from the network for interference cancellation with respect to the uplink frequency allocation; modulating a plurality of symbols on the uplink frequency allocation and on a plurality of interference cancellation subcarriers in accordance with the instruction from the network; and transmit a waveform to the network, the waveform including the plurality of symbols In an additional aspect of the disclosure, a user equipment (UE). The user equipment also includes means for communicating with a network over uplink (UL) transmissions; means for receiving an instruction from the network to perform interference cancellation on the UL transmissions with respect to a frequency area associated with a sidelink (SL) communication; means for performing interference cancellation on the UL transmissions, including modulating a plurality of symbols on a frequency allocation for the UL transmissions as well as on a plurality of interference cancellation subcarriers; and means for transmitting the plurality of symbols to the network.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
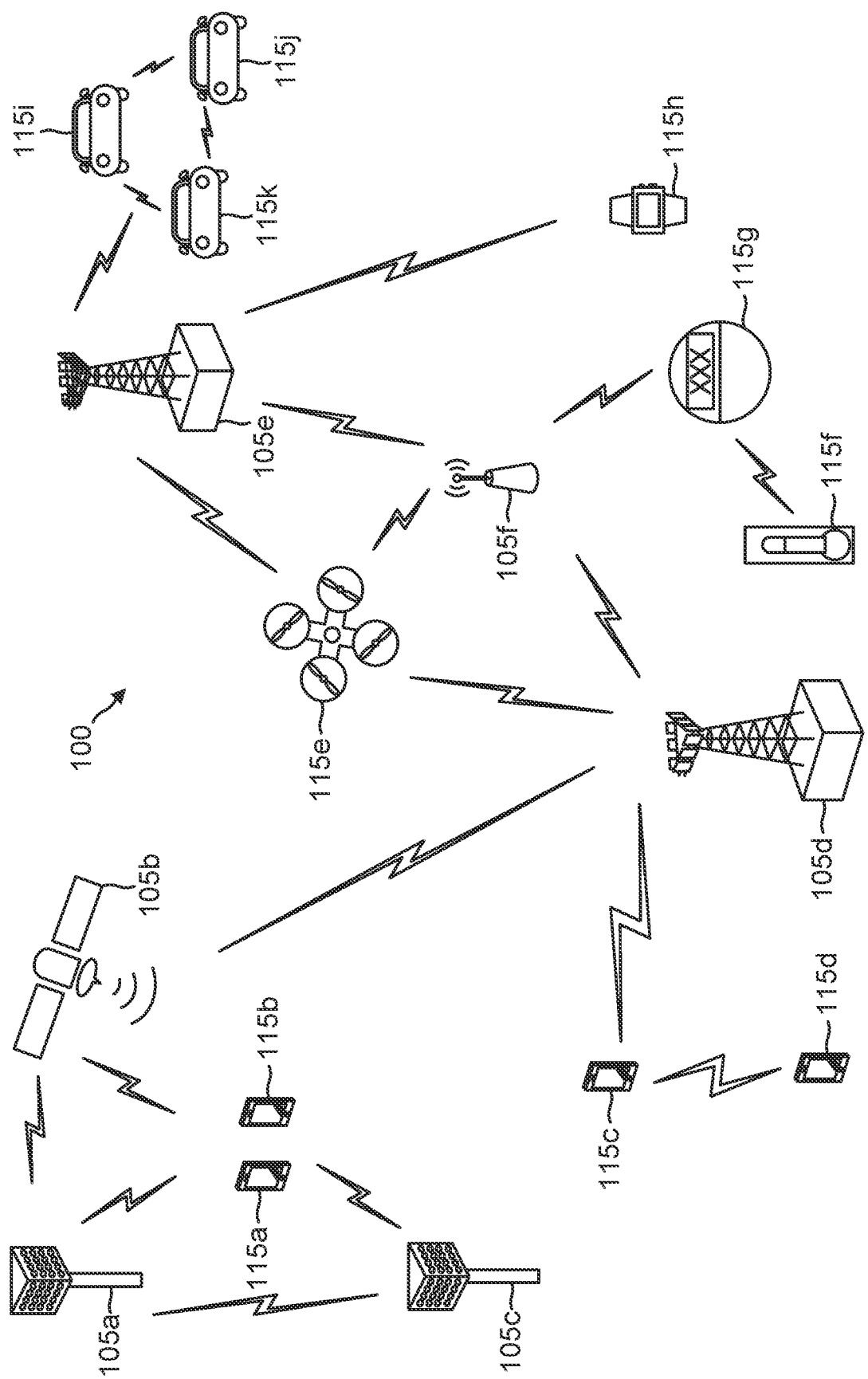
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR has adopted OFDM for uplink, downlink, and sidelink. One drawback of OFDM is that it may exhibit high side lobes in the frequency domain. The side lobes may interfere with other waveforms, especially if the UEs in an area are not well synchronized in the time domain and the frequency domain.

Put another way, frequency division multiplexed (FDM) transmissions typically employ tight timing and frequency synchronization among different users, and the typical scenario may include multiple UEs all synchronized to the same base station (BS). But that may be difficult with some sidelink transmissions. A sidelink may use uplink resources, and the sidelink in the uplink may then be multiplexed by FDM. However, a sidelink UE may be synchronized to a different source, such as satellite transmissions, a different base station, or another UE. This may cause a relative synchronization error between the sidelink in the uplink to be large and, thus, the side lobe may cause an unacceptable amount of interference in that scenario. One solution that has been used is adding guard bands when a sidelink and an uplink are both used, but a guard band may waste frequency resources.

The present application describes mechanisms to reduce the interference between sidelink (SL) and uplink (UL) communications. Specifically, various implementations may use an active interference cancellation (AIC) technique within a UL transmission to reduce or eliminate interference from that UL transmission toward an SL transmission. For instance, a given UL transmission may also include subcarriers that, rather than carrying data, are present for the purpose of side lobe suppression. Thus, the UE that is associated with the UL transmission may place one or more cancellation subcarriers, having phase, amplitude, frequency, and time domain characteristics, within the UL transmission to suppress the side lobes.

In some aspects, an example method is performed by a user equipment (UE). The UE receives a configuration from a network for uplink (UL) transmission using a first plurality of subcarriers. For instance, the UE may be configured for certain frequencies in the frequency domain and slots in the time domain for use in transmitting data. The UE may also receive an instruction from the network for interference cancellation with respect to the first plurality of subcarriers. In other words, the network may instruct the UE to perform interference cancellation, and the network may give the instruction in response to determining that there is a sidelink transmission waveform (either at the UE or another UE) that may suffer interference from the UL transmission.

In some aspects, the instruction from the network may be by Radio Resource Control (RRC), Downlink Control Information (DCI), or other appropriate signaling. The instruction may include any appropriate information to cause the UE to provide reduction of interference through automatic interference cancellation (AIC) techniques. For instance, the network may instruct the UE by providing an indication of a number of subcarriers within a second plurality of subcarriers, the second plurality of subcarriers being designated as interference cancellation subcarriers, an indication of indexes of the interference cancellation subcarriers, an indication of time domain symbols in which to apply the interference cancellation subcarriers, an indication of a sidelink frequency to be protected, and/or the like. The UE may then calculate phases and amplitudes for the interference cancellation subcarriers, calculate symbols, and modulate the cancellation symbols on the first plurality of subcarriers as well as the interference cancellation subcarriers.

In other examples, the network may transmit less information to the UE. For instance, the network may not transmit an indication of time domain symbols for protection or an indication of frequencies to be protected, and the UE may then assume that interference cancellation should apply to the entire time domain of the UL and all frequencies outside of the UL. In another example, the network may indicate only a specified leakage level on a particular frequency area and time domain area, and then the UE may determine on its own interference cancellation parameters. Furthermore, in some aspects, the network may configure the UE not to apply interference cancellation to an automatic gain control (AGC) symbol of the sidelink waveform.

The UE may then transmit a waveform to the network, the waveform including the first plurality of subcarriers and the interference cancellation subcarriers. In some aspects, the effect of transmitting the first plurality of subcarriers and the interference cancellation subcarriers is that side lobes attributable to the first plurality of subcarriers are reduced. The reduction in the side lobes may then result in less interference for the sidelink transmission.

In some aspects, the instructions from the network to the UE may be sent to a group of UEs, such as by using group common (GC) physical downlink control channel (PDCCH) on DCI. In another example, the network may transmit a DCI individually to each UE.

Various embodiments may include techniques performed by the network BS as well. For instance, the network BS may be aware of sidelink transmissions and then calculate interference cancellation parameters. The network BS may then instruct one or more UEs to perform interference cancellation according to the interference cancellation parameters. When the BS receives UL transmissions from those UEs, it may then disregard the frequencies associated with the interference cancellation subcarriers.

Aspects of the present disclosure may provide several benefits. For example, the interference cancellation may reduce interference toward sidelink transmissions while at the same time being efficient with spectrum. Specifically, it may be more efficient of available spectrum to use interference cancellation subcarriers than to configure guard bands. The available spectrum may then be used for other UL, downlink (DL), and sidelink (SL) transmissions.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, one or more UEs 115 may be configured by a BS 105 to perform interference cancellation techniques. For instance, as discussed in more detail below, one or more UEs may be configured to use additional subcarriers to reduce side lobes of their original UL signals to protect one or more frequencies in use by sidelinks.

Figure 2:
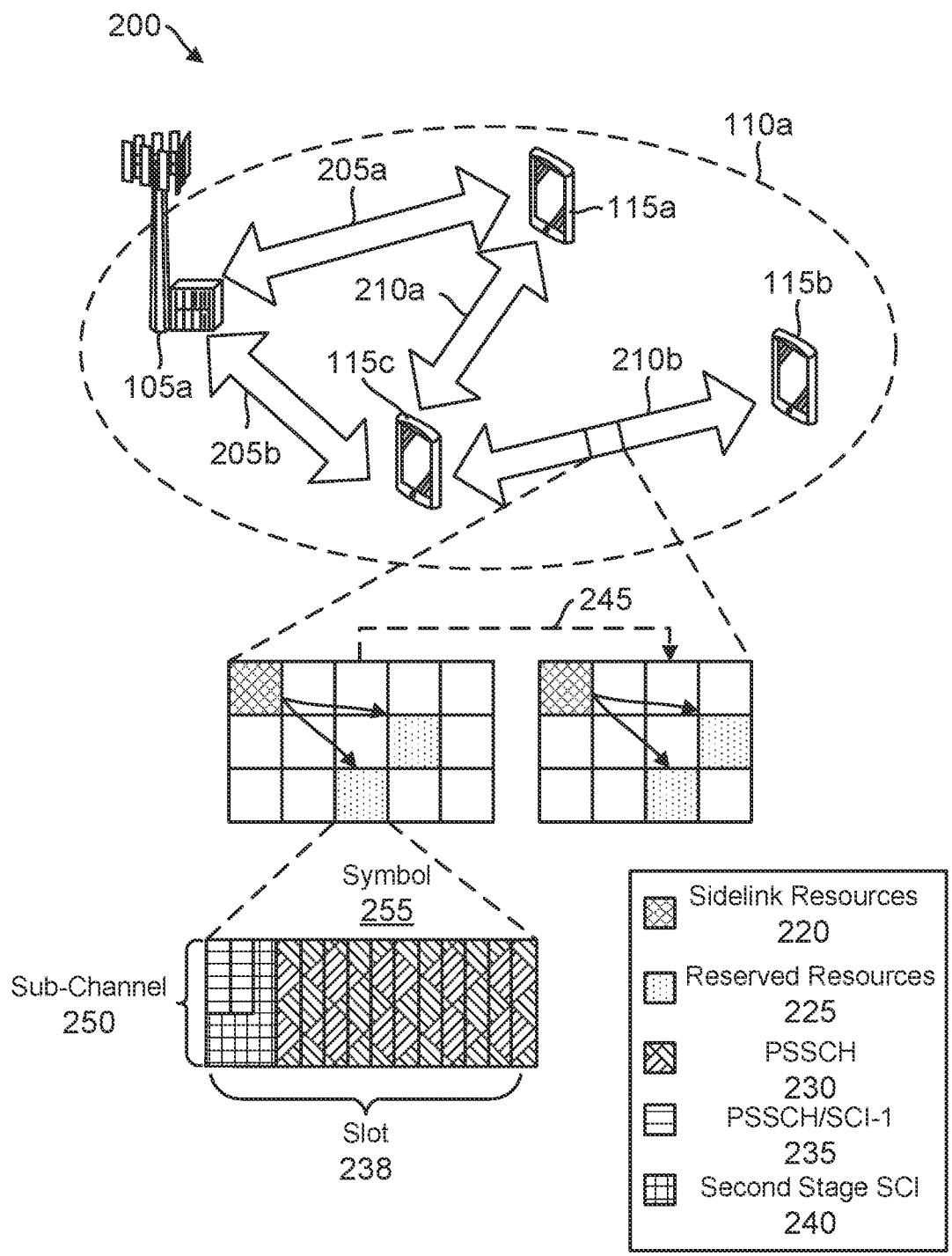
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit sidelink control information (SCI) to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200).

Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220.

The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the BS 105 may configure a UE 115 to perform interference cancellation on its UL signal to reduce an amount of interference that would otherwise be experienced by a sidelink communication link 210. For instance, the BS 105 may be aware of resources used by the sidelink communication link 210 and then instruct one or more of the UEs 115 to perform interference cancellation to protect those resources in both the time domain and the frequency domain.

Figure 3:
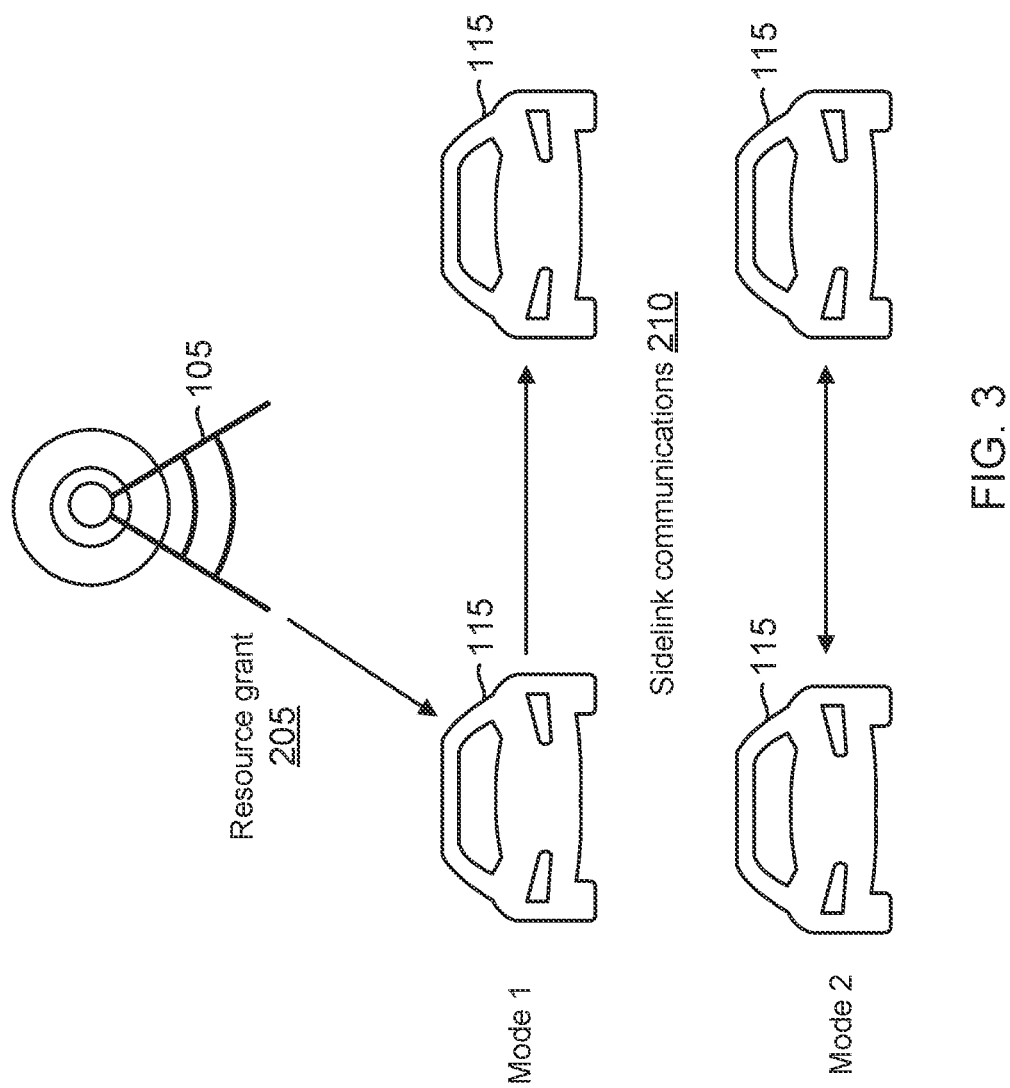
FIG. 3 illustrates an example network using sidelinks according to some aspects of the present disclosure.

FIG. 3 is an illustration of example operating modes using sidelink communication links, according to one implementation. More specifically, the embodiment of FIG. 3 illustrates an example cellular vehicle-to-everything (C-V2X) implementation in which the vehicles operate as UEs, similar to the UEs 115 of FIGS. 1 and 2.

In Mode 1, the network base station assigns sidelink resources, whereas in A mode 2 the vehicles themselves autonomously decide resources for sidelink communications. In a Mode one example, it supports dynamic grants (DG), configured grants (CG) types 1 and 2. CG type 1 is activated via RRC signaling from the network base station, where DCI is transmitted by the network base station to allocate time and frequency resources as well as transmission timing, and MCS is left to the UE within limits set by the network base station.

In an example of Mode 2, the vehicle transmitters perform channel sensing by blindly decoding all PSCCH channels to determine which ones are reserved in which ones are not reserved for other sidelink transmissions. The vehicle transmitters then report available resources to upper layer logic, which determines resource usage.

Of course, the scope of implementations is not limited to C-V2X, as sidelinks may be used in a variety of different applications. For instance, industrial applications may use sidelinks to control robotic components, Internet of things (IoT) in residential settings in commercial settings may use sidelinks for control and data gathering, and the like.

Figure 4:
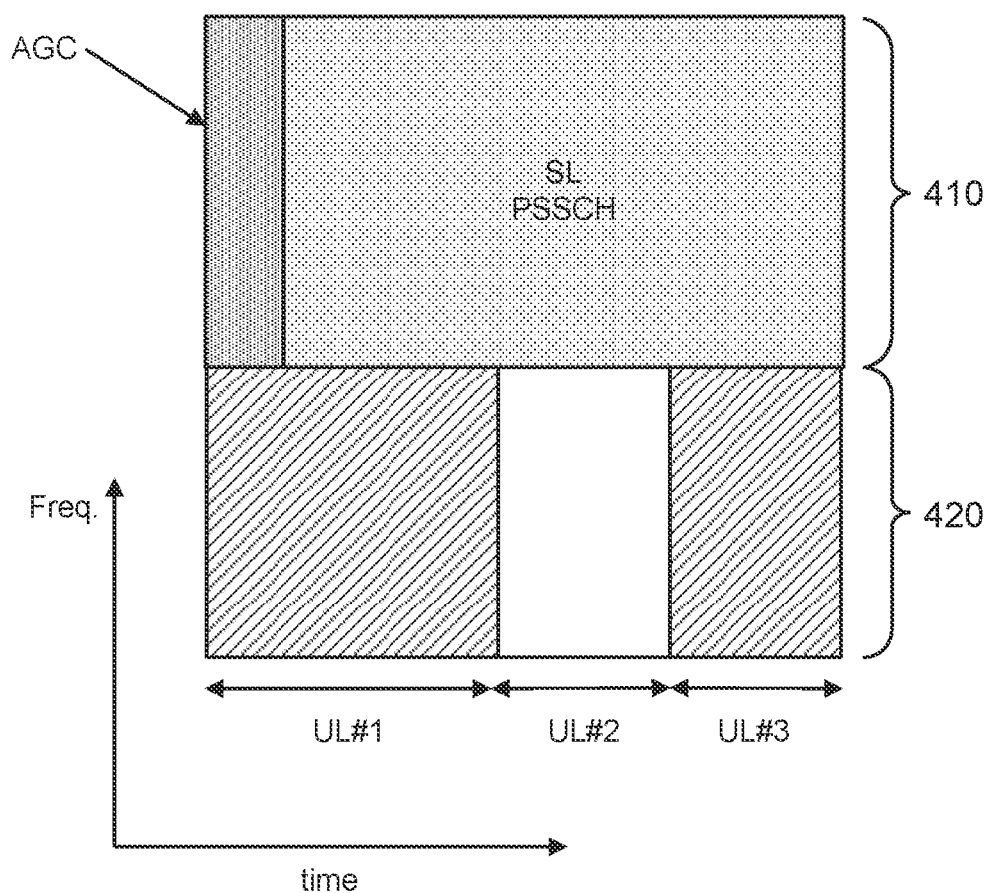
FIG. 4 illustrates an example relationship between a sidelink transmission and multiple uplink transmissions in both the time domain and the frequency domain according to some aspects of the present disclosure.

FIG. 4 illustrates an example scenario in which a sidelink and uplinks are used, according to one implementation. The y-axis of FIG. 4 shows frequency, whereas the x-axis shows time. The sidelink (SL) 410 uses the same time resources as the UL signals 420 and in adjacent (or nearly adjacent) frequencies.

SL 410 includes an automatic gain control (AGC) portion as well as a physical sidelink shared channel (PSSCH) portion. In this example, the AGC portion does not include data, whereas the PSSCH portion may include data. The UL signals 420 may be from the same UE that transmits the SL 410, from different UEs, or from a combination of the two.

The proximity of the frequency resources of the SL 410 and the UL signals 420 may result in a situation in which side lobes associated with the UL signals 420 cause interference with the SL 410. For instance, there may be a relative synchronization error between the SL 410 and the UL signals 420, and that relative synchronization error may manifest itself in side lobe interference. In some instances, it may not be of much value to protect the AGC portion, but if the data in the PSSCH portion is unreadable due to interference, then it may result in re-transmission and loss of throughput within the channel. Accordingly, various implementations include interference cancellation subcarriers in the UL signals 420 to reduce side lobes that would otherwise affect the SL 410.

Figure 5:
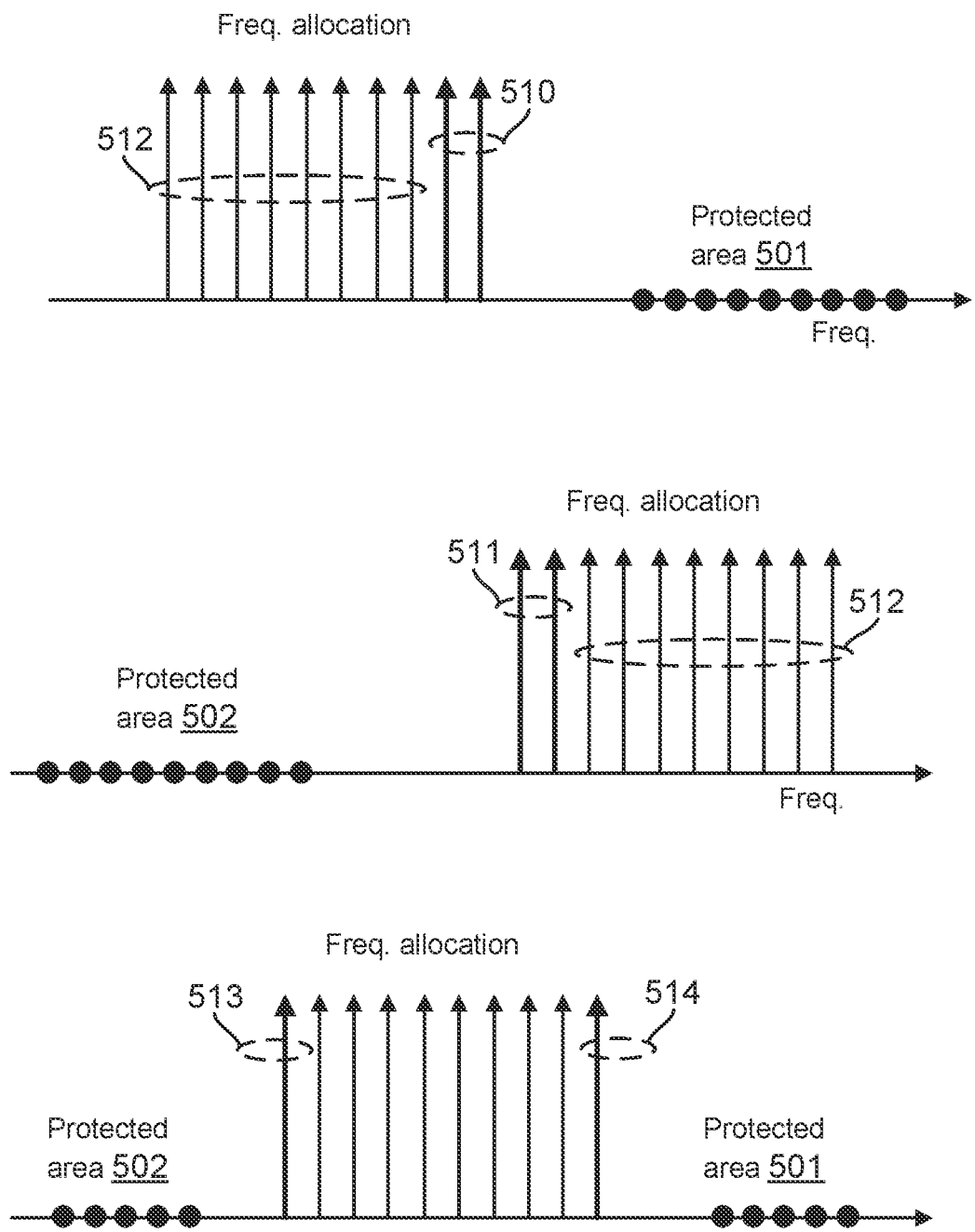
FIG. 5 illustrates interference cancellation techniques according to some aspects of the present disclosure.

FIG. 5 illustrates a technique that may be employed by a network BS and a UE to reduce or eliminate side lobe interference experienced by a SL signal and attributable to a UL signal, according to one implementation. In the top-most scenario of FIG. 5, the frequency allocation 512 of the UL signal is illustrated, and it corresponds to a first set of subcarriers that are configured for use in transmitting data and/or control information from the UE to the network BS. Without interference cancellation, it is expected that the side lobes attributable to the subcarriers of the frequency allocation 512 would affect SL signals in the protected area 501. Therefore, the UE adds interference cancellation subcarriers 510, which provide destructive interference with respect to the side lobes in the protected area 501, thereby eliminating or reducing interference that would otherwise affect an SL signal in the protected area 501.

The middle scenario is similar to the top-most scenario, but in the middle scenario the protected area 502 is at a lower frequency with respect to the subcarriers of the frequency allocation 512. Interference cancellation subcarriers 511 are added to cause destructive interference and reduce or eliminate interference that would otherwise be attributable to the side lobes associated with the frequency allocation 512.

The bottom-most scenario is offered to show that the scope of embodiments may reduce interference both above and below the frequencies associated with the subcarriers of the frequency allocation 512. In this example, interference cancellation subcarriers 513, 514 are added to both the top of the frequency allocation 512 and the bottom of the frequency allocation 512. The interference cancellation subcarriers 513, 514 operate to cause destructive interference of the side lobes associated with the frequency allocation 512 to reduce or eliminate the interference that would otherwise be expected to affect SL signals in the protected areas 501, 502.

It should be noted that the scenarios of FIG. 5 are for example only, and the scope of implementations is not so limited. For instance, interference cancellation subcarrier positions are not necessarily placed at the boundaries of a frequency allocation. Rather, depending on the modulations and position of frequency allocation 512 and any protected areas, the interference cancellation positions may be specifically adapted. Furthermore, various implementations may include pre-configured patterns associated with a set of 1) UL frequency allocation and 2) protected area for SL.

Continuing with the example, a network BS (e.g., 105 of FIGS. 1-3) instructs the UE 115 associated with the UL frequency allocation 512 to perform interference cancellation. For instance, the network BS may use a GC-PDCCH to address multiple UL UEs or may transmit DCI specifically to individual UEs. Further details are provided with respect to FIG. 6.

Figure 6:
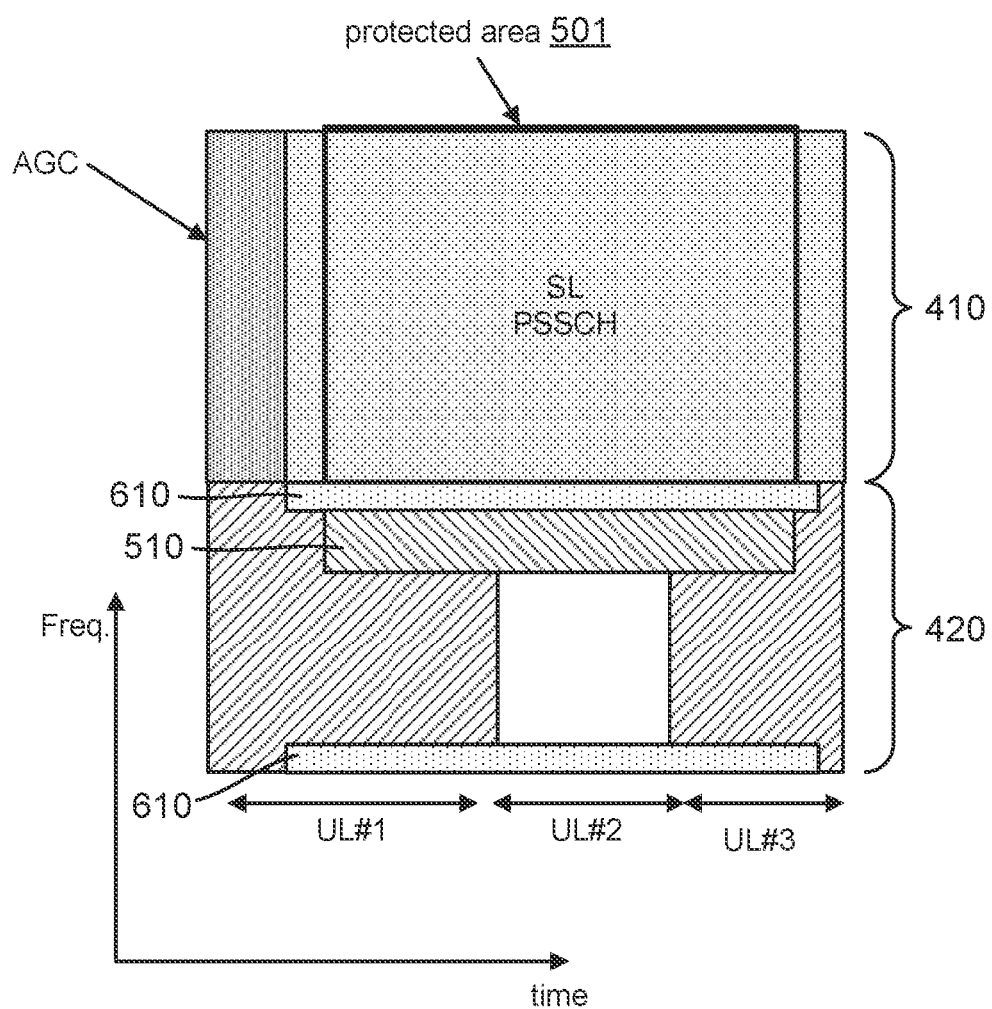
FIG. 6 illustrates interference cancellation techniques according to some aspects of the present disclosure.

FIG. 6 is an illustration of an example interference cancellation technique, according to one implementation. In the example of FIG. 6, the protected area 501 corresponds to the PSSCH portion of the SL 410, and the AGC portion is unprotected. A first approach (option 1) includes adding interference cancellation subcarriers 510 to reduce interference with a protected area 501. In a second approach (option 2), interference cancellation subcarrier 610 are added.

Looking at the first approach (option 1) first, it includes instructing multiple UEs via GC-PDCCH to perform interference cancellation by adding interference cancellation subcarriers 510 to their UL signals 420. In other words, each of the different multiple UEs would add the same interference cancellation subcarriers 510.

The network BS may provide any appropriate information (e.g., parameters) in the PDCCH to cause the UEs to be instructed to perform interference cancellation. For instance, the PDCCH may indicate a selected frequency position above (and/or below) which the leakage should be minimized. In this example, the protected area 501 is shown, and it corresponds to the selected frequency position. Further in this example, the protected area 501 may correspond to frequency resources that are used for the SL signal 410. The UEs are then expected to perform interference cancellation to minimize leakage in the protected area.

Continuing with the example, the PDCCH may indicate a number of interference cancellation subcarriers 510. In other words, the PDCCH may indicate how many subcarriers shall be used for the interference cancellation. The scope of implementations is not limited to any particular number of subcarriers, though examples may include 2 subcarriers, 4, 8, or the like. In addition to indicating a number of interference cancellation subcarriers, the PDCCH may also indicate subcarrier positions.

Specifically, the PDCCH may include indexes of the subcarriers that are used for interference cancellation, where those indexes correspond to different subcarrier frequencies. The indications of subcarrier indexes may be pre-configured and stored in a table so that a given UL signal frequency allocation may be used as a key to traverse the table and to identify appropriate subcarrier indices therefrom. It should be noted that any appropriate interference cancellation subcarrier position may be used, such as at an upper boundary or a lower boundary of the UL signal frequency allocation, or even interspersed within a UL signal frequency allocation. Appropriate interference cancellation subcarrier positions may be determined through simulation, experimentation, or any other appropriate techniques.

Additionally, the PDCCH may indicate time domain symbols where protection is expected. For instance, the PDCCH may avoid instructing the UEs to protect the AGC portion of the SL 410, whereas the PDCCH may instruct the UEs to protect the PSSCH portion of the SL 410.

Upon receiving instructions to perform interference cancellation, the UEs may then calculate phase and amplitude of the interference cancellation subcarriers, modulate cancellation symbols on the frequency allocation subcarriers as well as the interference cancellation subcarriers and then transmit a waveform on the UL that includes the frequency allocation subcarriers and the interference cancellation subcarriers.

The interference cancellation parameters may be included explicitly in DCI or in RRC signaling. In some instances, only those UEs that have UL frequency allocation within a particular number of resource blocks to the protected area 501 are required by the network BS to perform interference cancellation.

In some examples, those parameters noted above may not be indicated by the network BS. Rather, the network BS may only specify a leakage level (e.g., max. −80 dBm) and identify the protected area 501. In such an instance, the UEs may individually determine a number of interference cancellation subcarriers, the positions of the subcarriers, and phase and amplitude of the subcarriers to achieve the specified leakage level. Once calculated, the UEs may then indicate some or all of those parameters on the UL PUSCH as uplink control information (UCI).

In a second approach (option 2), the network BS may transmit DCI to each UE individually. For instance, the DCI may include interference cancellation bits or fields into DCI messages that schedule UL transmissions. The interference cancellation parameters discussed above (e.g., protection area, number of interference cancellation subcarriers, etc.) may be included in the DCI messages. In one example, DCI messages may not indicate the protection area, and instead each UE assumes that the protection area is all areas that fall outside of its frequency domain allocation. By reducing an amount of information in the DCI messages, such example implementations may reduce overhead.

In another example, sets of interference cancellation parameters are pre-configured based on, e.g., protection area(s) and UL frequency allocation, and those sets of pre-configured interference cancellation parameters may be stored in a table or other appropriate data structure. The BS may then search the data structure for an appropriate set of interference cancellation parameters and then indicate the parameters using only a few bits to represent an operating mode. In such an example, each UE would also include tables that map the mode bits in the DCI signal to interference cancellation parameters and then apply the parameters as instructed. Different pre-configured AIC operation modes may include, e.g., interference cancellation off, interference cancellation on with 2 subcarriers, interference cancellation on with 4 subcarriers, and the like.

The second approach (option 2) is illustrated in one example using interference cancellation subcarriers 610. For instance, the network BS may configure the different UEs with different interference cancellation parameters, thereby resulting in different sets of interference cancellation subcarriers, such as illustrated by subcarriers 610.

In any event, actions performed by the UE and the base station using either the first approach or the second approach or a combination of the two may include various actions. In one example action, the UE receives instructions from the network BS to perform interference cancellation. The UE uses the information it receives from the network BS to then calculate symbols and modulate those symbols on the subcarriers, including both the frequency allocation subcarriers as well as the interference cancellation subcarriers. The UE then transmits a waveform including those symbols to the network base station. The network base station discards the signal received on the interference cancellation subcarriers and proceeds with decoding of PUSCH on subcarriers other than the interference cancellation subcarriers. Such actions are described in more detail with respect to FIGS. 8 and 9.

Figure 7:
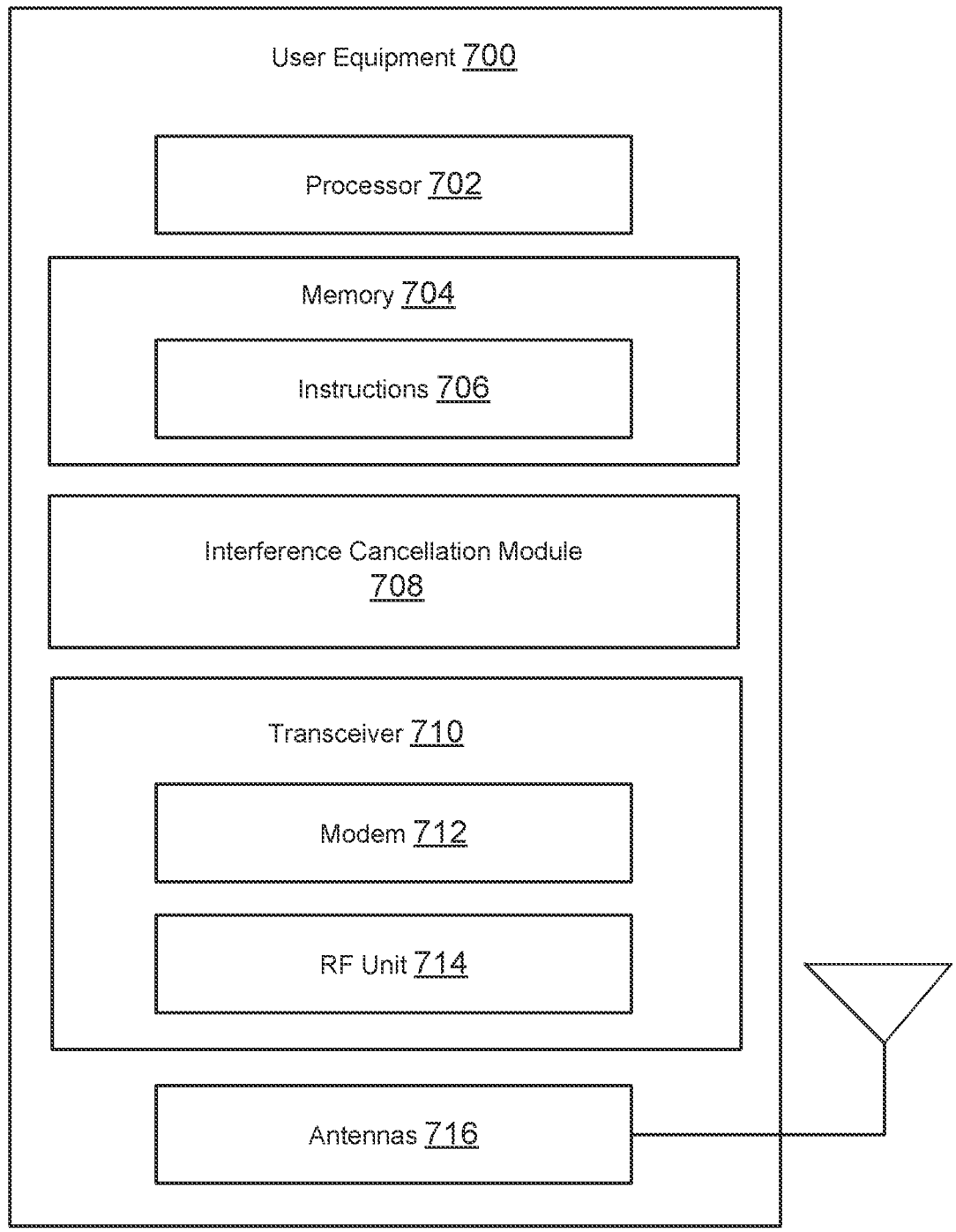
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the same as or similar to the UE 115 discussed above with respect to FIGS. 1-6. As shown, the UE 700 may include a processor 702, a memory 704, an interference cancellation module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 1-6 and 9. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference cancellation module 708 may be implemented via hardware, software, or combinations thereof. For example, the interference cancellation module 708 may be implemented as a processor, circuit, and/or instructions 706 stored in the memory 704 and executed by the processor 702.

In some aspects, the interference cancellation module 708 is configured to receive interference cancellation instructions from the network BS, carry out those instructions by adding interference cancellation subcarriers according to interference cancellation parameters, calculate symbols and modulate those symbols on the subcarriers, and cause the transceiver 810 to transmit those waveforms.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the Interference cancellation module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the interference cancellation module 708, and/or the transceiver 710. The processor 702 and may execute operating system (OS) code stored in the memory 704 in order to control and/or coordinate operations of the interference cancellation module 708 and/or the transceiver 710. In some aspects, the processor 702 may be implemented as part of the interference cancellation module 708.

Figure 8:
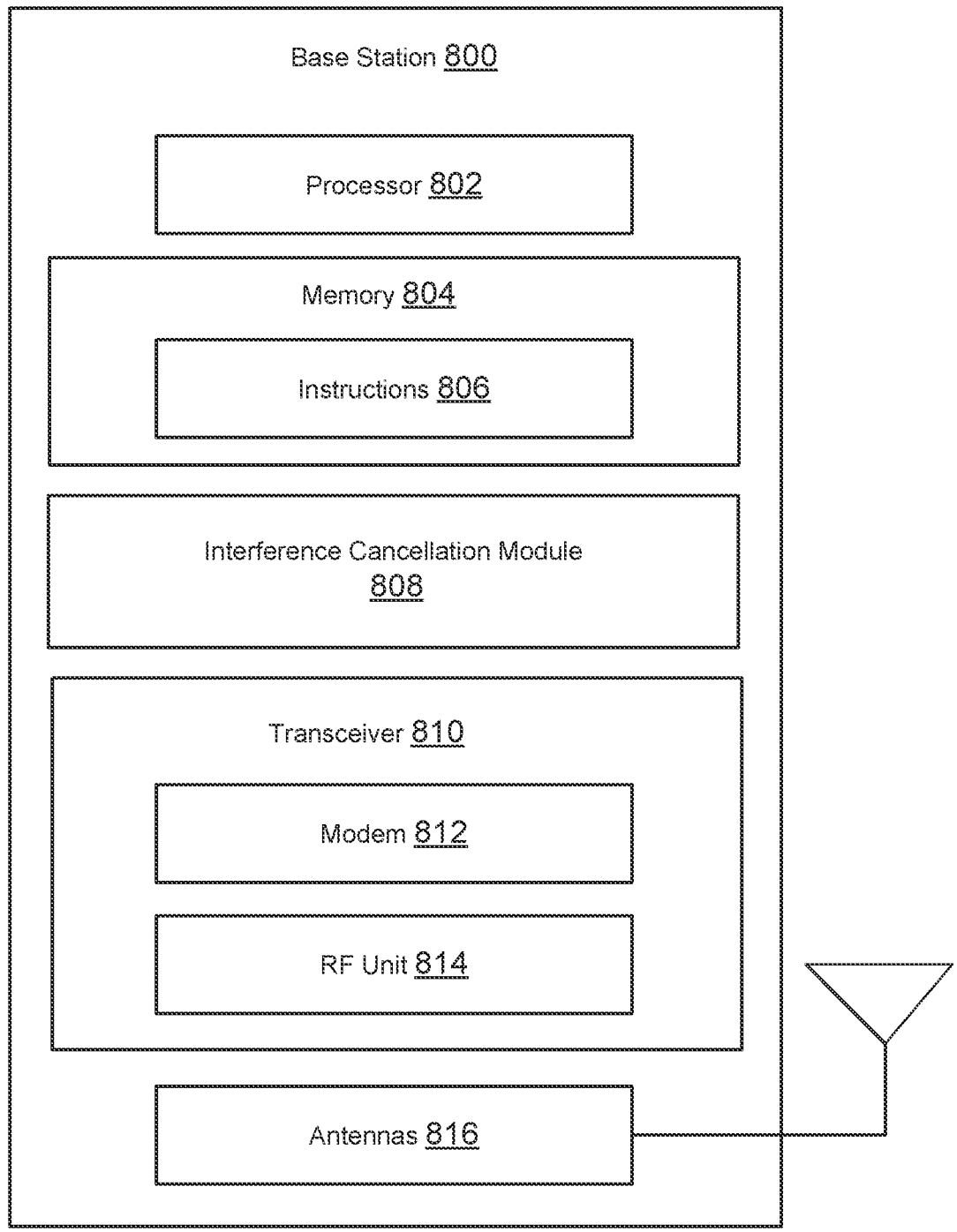
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, an interference cancellation module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-6 and 10. Instructions 806 may also be referred to as code, which may be interpreted broadly to include any type of computer-readable statement(s).

The interference cancellation module 808 may be implemented via hardware, software, or combinations thereof. For example, the interference cancellation module 808 may be implemented as a processor, circuit, and/or instructions 806 stored in the memory 804 and executed by the processor 802.

The Interference cancellation module 808 may be used for various aspects of the present disclosure, for example, aspects of FIGS. 1-6 and 10. In some aspects, the interference cancellation module 808 is configured to determine whether sidelink transmissions may be in use and may suffer interference from UL transmissions, instruct UEs to perform interference cancellation, receive waveforms in UL transmissions from the UEs, and decode the data in the UL transmissions while discarding any interference cancellation subcarriers and the waveforms.

Additionally or alternatively, the interference cancellation module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the Interference cancellation module 808, and/or the transceiver 810. The processor 802 may execute OS code stored in the memory 804 to control and/or coordinate operations of the Interference cancellation module 808, and/or the transceiver 810. In some aspects, the processor 802 may be implemented as part of the Interference cancellation module 808. In some aspects, the processor 802 is configured to transmit via the transceiver 810, to a UE, an indicator indicating a configuration of sub-slots within a slot.

Figure 9:
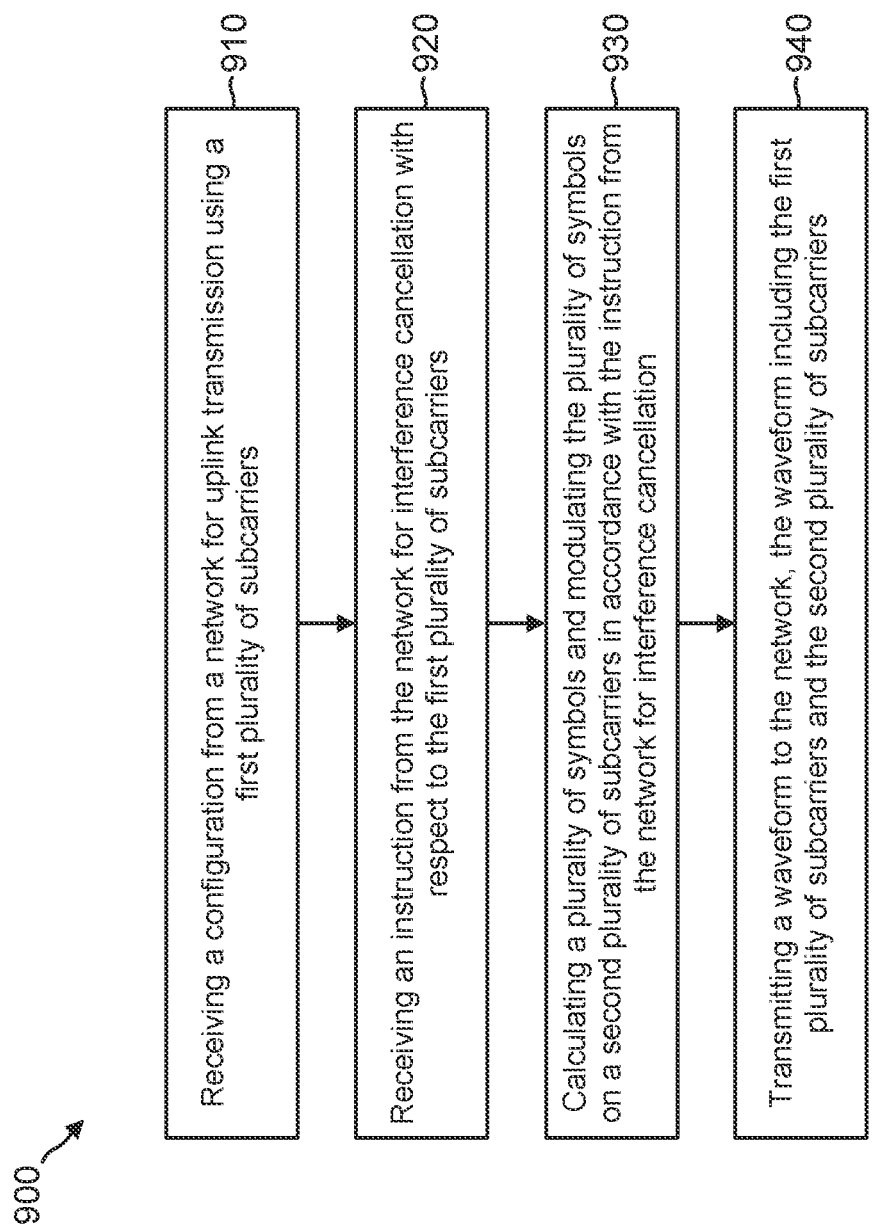
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 702, the memory 704, the interference cancellation module 708, the transceiver 710, the modem 712, and the one or more antennas 716, to execute aspects of method 900. The method 900 may employ similar mechanisms as in the networks 100 and 200 and the aspects and actions described with respect to FIGS. 1-6. As illustrated, the method 900 includes a number of enumerated actions, but the method 900 may include additional actions before, after, and in between the enumerated actions. In some aspects, one or more of the enumerated actions may be omitted or performed in a different order.

At action 910, the UE receives a configuration from the network for UL transmission using a first plurality of subcarriers. For instance, the UE may receive a frequency allocation for its UL transmissions, such as for transmissions on PUSCH. This frequency allocation may identify multiple subcarriers that are used for data.

Action 920, the UE receives an instruction from the network for interference cancellation with respect to the first plurality of subcarriers. An example is illustrated with respect to FIGS. 5-6, wherein the UE is instructed to perform interference cancellation to protect area 501 and/or 502 from side lobe interference attributable to the frequency allocation 512. Specifically, the instruction for interference cancellation may be to protect an SL transmission from side lobes of UL transmissions of one or more UEs. In fact, other UEs may receive the same instruction in a GC-DCI or in an individual DCI.

The instruction may include any appropriate parameters, such as a number of interference cancellation subcarriers, indexes of the interference cancellation subcarriers, an identification of one or more protected areas, time domain symbols in which protection is to be applied, a maximum leakage parameter for a protected area, and the like. The parameters are explained in more detail above with respect to FIGS. 5-6.

At action 930, the UE calculates a plurality of symbols and modulates the plurality of symbols on a second plurality of subcarriers in accordance with the instruction. For instance, the UE may determine phase and/or amplitude of interference cancellation subcarriers in response to the instruction at action 920. However, the scope of embodiments is not limited to any particular determination by the UE, such as to determine phase/amplitude, number of subcarriers for interference cancellation, or the like. Rather, an amount of autonomy for the UE to determine interference cancellation parameters may be different for different applications. In fact, in some applications, interference cancellation is pre-configured according to at least 1) UL frequency allocation and 2) protected area, and the network BS may transmit bits representing pre-configured modes, which the UE then implements using some amount of calculation, such as determining phase/amplitude.

Action 930 may further include, once the characteristics of the interference cancellation subcarriers are determined, calculating the symbols and modulating those symbols on the frequency allocation subcarriers as well as the second plurality of subcarriers (i.e., the interference cancellation subcarriers). In some instances, portions of the time domain may not include interference cancellation, such as portions corresponding to an AGC symbol, whereas other portions may include interference cancellation, such as for a PSSCH, as described above the respect to FIG. 6.

At action 940, the UE then transmits a waveform to the network (e.g., on the PUSCH). That waveform includes the symbols described above at action 930 and including the first plurality of subcarriers and the second plurality of subcarriers. The first plurality of subcarriers may be modulated to carry data, whereas the second plurality of subcarriers may be used for interference cancellation only.

The waveform of action 940 may cause destructive interference for side lobes associated with the UL frequency allocation. The destructive interference may therefore reduce an amplitude of the side lobes at least within the protected area(s). Reduction in the amplitudes of the side lobes may then result in less interference from the UL directed toward SL transmissions in the protected area(s).

Figure 10:
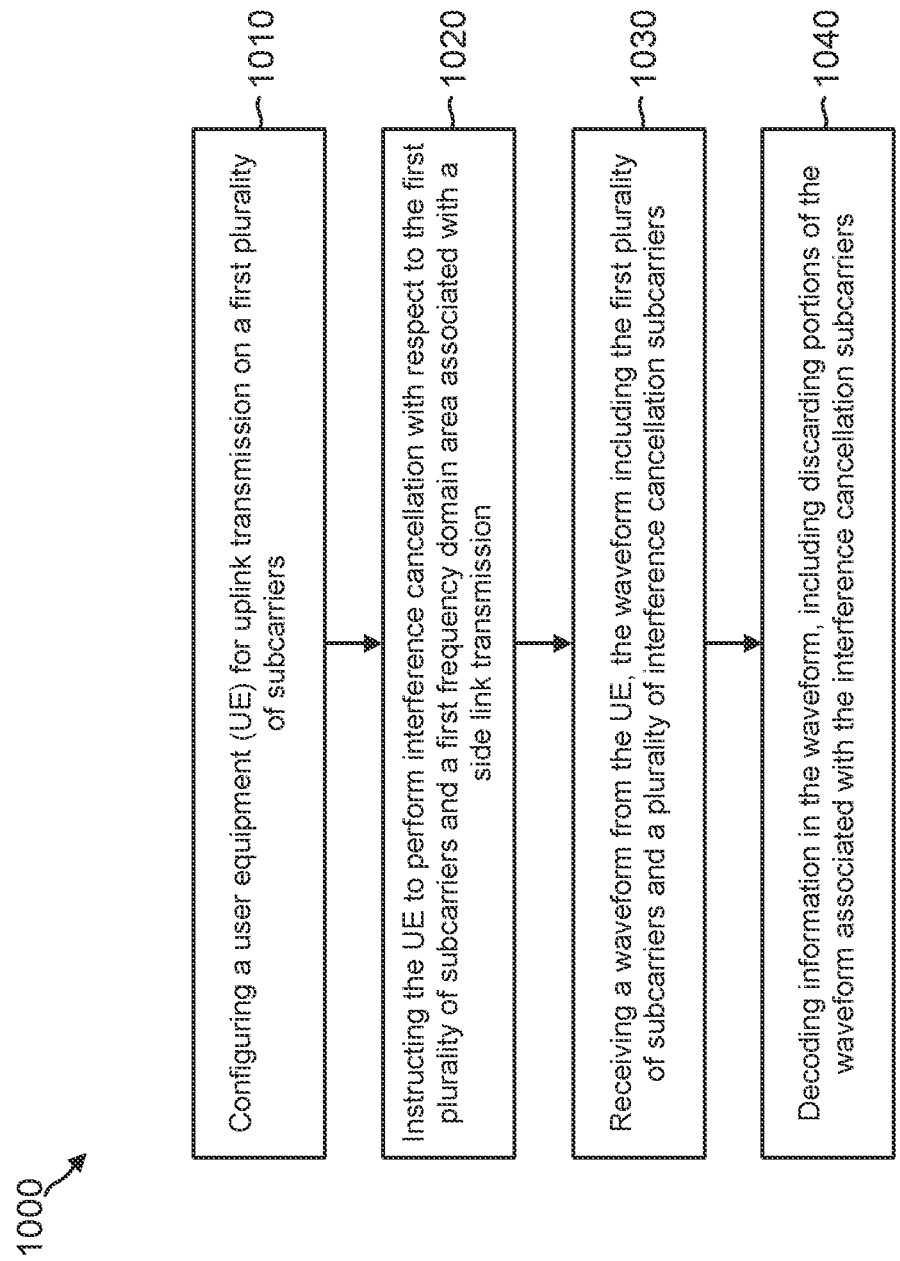
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the BS 105 or BS 800, may utilize one or more components, such as the processor 802, the memory 804, the interference cancellation module 808, the transceiver 810, the modem 812, and the one or more antennas 816, to execute aspects of method 1000. The method 1000 may employ similar mechanisms as in the actions described with respect to FIGS. 1-6. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the BS configures a UE for uplink transmission on a plurality of subcarriers. For instance, the UE may provide UL frequency allocation, such as for PUSCH.

At action 1020, the BS instructs the UE to perform interference cancellation with respect to the first plurality of subcarriers and a first frequency domain area associated with the SL transmission. For instance, the BS may be aware of the SL transmissions from other configurations or from being informed by other UEs about SL transmissions. In any event, the BS is aware of the use of both UL and SL and instructs the UE to perform interference cancellation with respect to its UL in order to protect the SL. Examples of instructing the UE to perform interference cancellation are described in more detail above with respect to FIGS. 5-6. For instance, the BS may provide information regarding pre-configured interference cancellation modes, may provide an identification of a protection area and a maximum leakage target, may provide a plurality of interference cancellation parameters, and/or the like. The BS may instruct a group of UEs according to GC-DCI or may instruct individual UEs.

At action 1030, the BS receives a waveform from the UE, where the waveform includes both a frequency allocation for the UL (i.e., the first plurality of subcarriers) as well as subcarriers used for interference cancellation.

At action 1040, the BS decodes information in the waveform. Action 1040 may include discarding portions of the waveform that are associated with the interference cancellation subcarriers. For instance, the interference cancellation subcarriers may carry no data. The BS is aware of the interference cancellation subcarriers either because the BS configured the UE to use the particular interference cancellation subcarriers or because the UE provided information to the BS to identify the interference cancellation subcarriers. The BS may use this information to decode the information in the waveform, including discarding those portions of the waveform associated with the interference cancellation subcarriers.

Further aspects of the present disclosure are described according to the following clauses:

1. A method of wireless communication performed by a user equipment (UE), the method comprising:
    receiving a configuration from a network for uplink transmission using a first plurality of subcarriers;
    receiving an instruction from the network for interference cancellation with respect to the first plurality of subcarriers;
    calculating a plurality of symbols and modulating the plurality of symbols on a second plurality of subcarriers in accordance with the instruction from the network for interference cancellation; and
    transmitting a waveform to the network, the waveform including the first plurality of subcarriers and the second plurality of subcarriers.

2. The method of clause 1, wherein the instruction from the network for interference cancellation is included in an item selected from a list consisting of: Radio Resource Control (RRC) information; and Downlink Control Information (DCI).

3. The method of clause 1, wherein the instruction from the network for interference cancellation is included in an item selected from a list consisting of:
    a group common Downlink Control Information (DCI) for the UE and a plurality of other UEs; and
    a dedicated DCI to the UE.

4. The method of clauses 1-3, wherein the instruction from the network for interference cancellation comprises:
    an indication of a number of subcarriers within the second plurality of subcarriers;
    an indication of indexes of subcarriers within the second plurality of subcarriers; and an indication of time domain symbols in which to apply the second plurality of subcarriers.

5. The method of clause 4, further comprising:
    calculating either or both of phases and amplitudes of the second plurality of subcarriers according to the instruction from the network for interference cancellation.

The method of clause 4, wherein the UE does not apply interference cancellation to an automatic gain control (AGC) symbol of a sidelink waveform.

7. The method of clause 1, wherein the instruction from the network for interference cancellation comprises:
    a specified leakage level of the first plurality of subcarriers with respect to a frequency area for interference cancellation.

8. The method of clause 7, further comprising:
    calculating a number of subcarriers within the second plurality of subcarriers, positions of the second plurality of subcarriers, and amplitudes of the second plurality of subcarriers according to the specified leakage level; and
    providing an indication to the network of the number of subcarriers within the second plurality of subcarriers and the positions of the second plurality of subcarriers.

9. The method of clause 8, wherein the indication to the network is provided by uplink control information (UCI) on a Physical Uplink Shared Channel (PUSCH).

10. The method of clauses 1 and 2-3, wherein the instruction from the network for interference cancellation is included Downlink Control Information (DCI), wherein the DCI includes at least one interference cancellation field to include the instruction from the network for interference cancellation.

11. The method of clause 10, wherein the DCI is configured to indicate a plurality of modes including:
    interference cancellation off;
    interference cancellation on, with the second plurality of subcarriers being equal to a first quantity of subcarriers; and
    interference cancellation on, with the second plurality of subcarriers being equal to a second quantity of subcarriers.

12. The method of clause 1, wherein the instruction from the network for interference cancellation includes a configuration for a threshold of frequency distance to a side lobe waveform, and wherein calculating the plurality of symbols is performed in response to determining that the first plurality of subcarriers is within the threshold of frequency distance.

13. The method of clause 1, wherein the instruction from the network for interference cancellation does not specify a frequency area for interference cancellation, further wherein the UE assumes that the frequency area for interference cancellation includes all areas that are outside of the first plurality of subcarriers.

14. A non-transitory computer-readable medium having program code recorded thereon, the program code comprising:
    code for configuring a user equipment (UE) for uplink transmission on a first plurality of subcarriers;
    code for instructing the UE to perform interference cancellation with respect to the first plurality of subcarriers and a first frequency domain area associated with a sidelink transmission;
    code for receiving a waveform from the UE, the waveform including the first plurality of subcarriers and a plurality of interference cancellation subcarriers; and
    code for decoding information in the waveform, including discarding portions of the waveform associated with the interference cancellation subcarriers.

15. The non-transitory computer-readable medium of clause 14, further comprising:
    code for receiving uplink control information (UCI) from the UE, the UCI including a plurality of parameters associated with the interference cancellation subcarriers; and
    code for decoding the information in the waveform according to the plurality of parameters.

16. The non-transitory computer-readable medium of clause 14, wherein the code for instructing the UE to perform interference cancellation includes code for transmitting an item selected from a list consisting of:
    a group common Downlink Control Information (DCI) for the UE and a plurality of other UEs; and
    a dedicated DCI to the UE.

17. The non-transitory computer-readable medium of clause 14, wherein the code for instructing the UE to perform interference cancellation comprises code for providing information to the UE, including:
    an identification of the first frequency domain area; and
    an identification of a maximum amount of leakage allowed in the first domain frequency area.

18. The non-transitory computer-readable medium of clause 14, wherein the code for instructing the UE to perform interference cancellation comprises code for providing information to the UE, including:

an indication of a number of subcarriers within the interference cancellation subcarriers;
an indication of indexes of subcarriers within the interference cancellation subcarriers; and
an indication of time domain symbols in which to apply the interference cancellation subcarriers.
19. An apparatus comprising:
a transceiver; and
a processor coupled to the transceiver and configured to:
receive a configuration from a network for uplink transmission according to an uplink frequency allocation;
receive an instruction from the network for interference cancellation with respect to the uplink frequency allocation;
modulating a plurality of symbols on the uplink frequency allocation and on a plurality of interference cancellation subcarriers in accordance with the instruction from the network; and
transmit a waveform to the network, the waveform including the plurality of symbols.
20. The apparatus of clause 19, wherein the instruction includes an identification of a pre-configured interference cancellation mode.
21. The apparatus of clause 19, wherein the instruction comprises:
an indication of a number of subcarriers within the interference cancellation subcarriers;
an indication of indexes of subcarriers within the interference cancellation subcarriers; and
an indication of time domain symbols in which to apply the interference cancellation subcarriers.
22. The apparatus of clause 21, wherein the processor is further configured to:
calculate either or both of phases and amplitudes of the interference cancellation subcarriers according to the instruction.
23. The apparatus of clause 19, wherein the instruction is included in an item selected from a list consisting of:
a group common Downlink Control Information (DCI) for the apparatus and a plurality of other apparatuses; and
a dedicated DCI to the apparatus.
24. The apparatus of clause 19, wherein the instruction comprises: a specified leakage level of the uplink frequency allocation with respect to a frequency area for interference cancellation.
25. The apparatus of clause 24, further comprising:
calculating a number of subcarriers within the interference cancellation subcarriers, positions of the interference cancellation subcarriers, and amplitudes of the interference cancellation subcarriers according to the specified leakage level; and
providing an indication to the network of the number of subcarriers within the interference cancellation subcarriers and the positions of the interference cancellation subcarriers.
26. A user equipment (UE) comprising:
means for communicating with a network over uplink (UL) transmissions;
means for receiving an instruction from the network to perform interference cancellation on the UL transmissions with respect to a frequency area associated with a sidelink (SL) communication;
means for performing interference cancellation on the UL transmissions, including modulating a plurality of symbols on a frequency allocation for the UL transmissions as well as on a plurality of interference cancellation subcarriers; and means for transmitting the plurality of symbols to the network.
27. The UE of clause 26, wherein the instruction comprises:
a specified leakage level of the UL transmissions with respect to the frequency area associated with the SL communication.
28. The UE of clause 27, further comprising:
means for calculating a number of subcarriers within the interference cancellation subcarriers, positions of the interference cancellation subcarriers, and amplitudes of the interference cancellation subcarriers according to the specified leakage level; and
means for providing an indication to the network of the number of subcarriers within the interference cancellation subcarriers and the positions of the interference cancellation subcarriers.
29. The UE of clause 26, wherein the instruction is included Downlink Control Information (DCI), wherein the DCI includes at least one interference cancellation field to include the instruction.
30. The UE of clause 29, wherein the DCI is configured to indicate a plurality of modes including:
interference cancellation off;
interference cancellation on, with the interference cancellation subcarriers being equal to a first quantity of subcarriers; and
interference cancellation on, with the interference cancellation subcarriers being equal to a second plurality of subcarriers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving a configuration from a network for uplink transmission using a first plurality of subcarriers;
   receiving an instruction from the network identifying a frequency area associated with a sidelink communication for interference cancellation with respect to the first plurality of subcarriers;
   calculating a plurality of symbols and modulating the plurality of symbols on a second plurality of subcarriers based on the frequency area for interference cancellation
   transmitting a sidelink waveform to a second UE; and
   transmitting a waveform to the network, the waveform including the first plurality of subcarriers and the second plurality of subcarriers without applying interference cancellation to an automatic gain control (AGC) symbol of the sidelink communication.

2. The method of claim 1, wherein the instruction from the network for interference cancellation is included in an item selected from a list consisting of:
   Radio Resource Control (RRC) information; and
   Downlink Control Information (DCI).

3. The method of claim 1, wherein the instruction from the network for interference cancellation is included in an item selected from a list consisting of:
   a group common Downlink Control Information (DCI) for the UE and a plurality of other UEs; and
   a dedicated DCI to the UE.

4. The method of claim 1, wherein the instruction from the network for interference cancellation comprises:
   an indication of a number of subcarriers within the second plurality of subcarriers;
   an indication of indexes of subcarriers within the second plurality of subcarriers; and
   an indication of time domain symbols in which to apply the second plurality of subcarriers.

5. The method of claim 4, further comprising:
   calculating either or both of phases and amplitudes of the second plurality of subcarriers according to the instruction from the network for interference cancellation.

6. The method of claim 1, wherein the instruction from the network for interference cancellation comprises:
   a specified leakage level of the first plurality of subcarriers with respect to the frequency area.

7. The method of claim 6, further comprising:
   calculating a number of subcarriers within the second plurality of subcarriers, positions of the second plurality of subcarriers, and amplitudes of the second plurality of subcarriers according to the specified leakage level; and
   providing an indication to the network of the number of subcarriers within the second plurality of subcarriers and the positions of the second plurality of subcarriers.

8. The method of claim 7, wherein the indication to the network is provided by uplink control information (UCI) on a Physical Uplink Shared Channel (PUSCH).

9. The method of claim 1, wherein the instruction from the network for interference cancellation is included Downlink Control Information (DCI), wherein the DCI includes at least one interference cancellation field to include the instruction from the network for interference cancellation.

10. The method of claim 9, wherein the DCI is configured to indicate a plurality of modes including:
    interference cancellation off;
    interference cancellation on, with the second plurality of subcarriers being equal to a first quantity of subcarriers; and
    interference cancellation on, with the second plurality of subcarriers being equal to a second quantity of subcarriers.

11. The method of claim 1, wherein the instruction from the network for interference cancellation includes a configuration for a threshold of frequency distance to a side lobe waveform, and wherein calculating the plurality of symbols is performed in response to determining that the first plurality of subcarriers is within the threshold of frequency distance.

12. The method of claim 1, wherein the instruction from the network for interference cancellation does not specify the frequency area, further wherein the UE assumes that the frequency area for interference cancellation includes all areas that are outside of the first plurality of subcarriers.

13. An apparatus comprising:
    a processing system that includes one or more processors and one or more memories coupled with the one or more processors, the processing system configured to cause the apparatus to:
    receive a configuration from a network for uplink transmission according to an uplink frequency allocation;
    receive an instruction from the network identifying a frequency area associated with a sidelink communication for interference cancellation with respect to the uplink frequency allocation;
    modulating a plurality of symbols on the uplink frequency allocation and on a plurality of interference cancellation subcarriers based on the frequency area
    transmit a sidelink waveform to a second apparatus; and
    transmit a waveform to the network, the waveform including the plurality of symbols without applying interference cancellation to an automatic gain control (AGC) symbol of the sidelink communication.

14. The apparatus of claim 13, wherein the instruction includes an identification of a pre-configured interference cancellation mode.

15. The apparatus of claim 13, wherein the instruction comprises:
    an indication of a number of subcarriers within the interference cancellation subcarriers;
    an indication of indexes of subcarriers within the interference cancellation subcarriers; and
    an indication of time domain symbols in which to apply the interference cancellation subcarriers.

16. The apparatus of claim 15, wherein the processing system is further configured to cause the apparatus to:
calculate either or both of phases and amplitudes of the interference cancellation subcarriers according to the instruction.

17. The apparatus of claim 13, wherein the instruction is included in an item selected from a list consisting of:
a group common Downlink Control Information (DCI) for the apparatus and a plurality of other apparatuses; and
a dedicated DCI to the apparatus.

18. The apparatus of claim 13, wherein the instruction comprises:
a specified leakage level of the uplink frequency allocation with respect to the frequency area.

19. The apparatus of claim 18, wherein the processing system is further configured to cause the apparatus to:
calculating a number of subcarriers within the interference cancellation subcarriers, positions of the interference cancellation subcarriers, and amplitudes of the interference cancellation subcarriers according to the specified leakage level; and
providing an indication to the network of the number of subcarriers within the interference cancellation subcarriers and the positions of the interference cancellation subcarriers.

20. A user equipment (UE) comprising:
means for communicating with a network over uplink (UL) transmissions;
means for receiving an instruction from the network identifying a frequency area associated with a sidelink communication to perform interference cancellation on the UL transmissions;
means for performing interference cancellation on the UL transmissions, including modulating a plurality of symbols on a frequency allocation for the UL transmissions as well as on a plurality of interference cancellation subcarriers without applying interference cancellation to an automatic gain control (AGC) symbol of the sidelink communication;
means for transmitting a sidelink waveform to a second UE; and
means for transmitting the plurality of symbols to the network.

21. The UE of claim 20, wherein the instruction comprises:
a specified leakage level of the UL transmissions with respect to the frequency area associated with the SL communication.

22. The UE of claim 21, further comprising:
means for calculating a number of subcarriers within the interference cancellation subcarriers, positions of the interference cancellation subcarriers, and amplitudes of the interference cancellation subcarriers according to the specified leakage level; and
means for providing an indication to the network of the number of subcarriers within the interference cancellation subcarriers and the positions of the interference cancellation subcarriers.

23. The UE of claim 20, wherein the DCI is configured to indicate a plurality of modes including:
interference cancellation off;
interference cancellation on, with the interference cancellation subcarriers being equal to a first quantity of subcarriers; and
interference cancellation on, with the interference cancellation subcarriers being equal to a second plurality of subcarriers.

24. The UE of claim 20, wherein the instruction is included Downlink Control Information (DCI), wherein the DCI includes at least one interference cancellation field to include the instruction.

25. A method of wireless communication performed by a wireless communication device, the method comprising:
transmitting a configuration to a user equipment (UE) for uplink transmission using a first plurality of subcarriers;
transmitting an instruction to the UE identifying a frequency area associated with a sidelink communication for interference cancellation with respect to the first plurality of subcarriers;
receiving a waveform from the UE, the waveform including the first plurality of subcarriers and a second plurality of subcarriers without applying interference cancellation to an automatic gain control (AGC) symbol of the sidelink communication; and
decoding information in the waveform, including discarding portions of the waveform associated with the second plurality of subcarriers.

26. The method of claim 25, wherein the instruction to the UE for interference cancellation is included in an item selected from a list consisting of:
Radio Resource Control (RRC) information; and
Downlink Control Information (DCI).

27. The method of claim 25, wherein the instruction to the UE for interference cancellation is included in an item selected from a list consisting of:
a group common Downlink Control Information (DCI) for the UE and a plurality of other UEs; and
a dedicated DCI to the UE.

28. The method of claim 25, wherein the instruction to the UE for interference cancellation comprises:
an indication of a number of subcarriers within the second plurality of subcarriers;
an indication of indexes of subcarriers within the second plurality of subcarriers; and
an indication of time domain symbols in which to apply the second plurality of subcarriers.

29. The method of claim 28, wherein the instruction to the UE for interference cancellation comprises:
a specified leakage level of the uplink transmission with respect to the frequency area associated with sidelink communication.

* * * * *